(12) United States Patent
Farrell et al.

(10) Patent No.: US 7,059,821 B2
(45) Date of Patent: Jun. 13, 2006

(54) METHOD AND APPARATUS TO FACILITATE SEALING WITHIN TURBINES

(75) Inventors: Alison Carol Farrell, Niskayuna, NY (US); Douglas Carl Hofer, Clifton Park, NY (US); Norman Douglas Lathrop, Ballston Lake, NY (US); Raymond Kenneth Overbaugh, Jr., Berne, NY (US); Kenneth James Robertson, Broadalbin, NY (US); Michael Joseph Boss, Scotia, NY (US)

(73) Assignee: General Electric Company, Schenectady, NY (US)

(*) Notice: Subject to any disclaimer, the term of this patent is extended or adjusted under 35 U.S.C. 154(b) by 522 days.

(21) Appl. No.: 10/431,157

(22) Filed: May 7, 2003

(65) Prior Publication Data

US 2004/0223844 A1   Nov. 11, 2004

(51) Int. Cl.
*F01D 11/02* (2006.01)
*F01D 11/12* (2006.01)

(52) U.S. Cl. .................... 415/1; 415/173.7; 415/174.2; 415/173.5; 415/174.5; 415/173.4

(58) Field of Classification Search ............. 415/173.6, 415/173.7, 174.2, 173.4, 173.5, 174.5, 1
See application file for complete search history.

(56) References Cited

U.S. PATENT DOCUMENTS

| 953,674 | A | * | 3/1910 | Westinghouse | 415/173.6 |
|---|---|---|---|---|---|
| 1,861,960 | A | * | 6/1932 | Hanzlik | 415/168.4 |
| 2,336,323 | A | * | 12/1943 | Warren | 415/173.6 |
| 3,501,246 | A | * | 3/1970 | Hickey | 415/174.2 |
| 3,897,169 | A | * | 7/1975 | Fowler | 415/173.6 |
| 5,133,643 | A | | 7/1992 | Ortolano | |
| 5,261,785 | A | | 11/1993 | Williams | |
| 6,454,534 | B1 | | 9/2002 | Burnett et al. | |

\* cited by examiner

*Primary Examiner*—Ninh H. Nguyen
(74) *Attorney, Agent, or Firm*—Armstrong Teasdale LLP

(57) ABSTRACT

A method to facilitate sealing between a rotary component and a stationary component is provided. The rotary component includes at least one bucket secured thereon, the bucket having a flow admission side and a flow exit side. The method includes coupling a spill strip in a gap defined between the rotary and stationary component, wherein the spill strip has a substantially flat contact surface, and coupling a cover to a radially outer tip of the bucket, wherein a protrusion extends from the bucket cover to contact the substantially flat contact surface of the spill strip.

24 Claims, 2 Drawing Sheets

METHOD AND APPARATUS TO FACILITATE SEALING WITHIN TURBINES

BACKGROUND OF THE INVENTION

The present invention relates generally to rotary machines, and, more particularly, to methods and apparatus to facilitate sealing between rotary and stationary components within the rotary machine.

Steam and gas turbines are used, among other purposes, to generate power for electric generators. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one row of circumferentially spaced rotating blades or buckets.

Turbine efficiency depends at least in part on a radial clearance or gap between tips of the rotating buckets and the surrounding casing, and maintaining a clearance between the rotor and the diaphragm packings. If either clearance is too large, steam or gas flow may leak through the clearance gaps, thus decreasing the turbine's efficiency. Alternatively, if either clearance is too small, the rotor bucket tips may undesirably contact the surrounding casing during certain turbine operating conditions. Gas or steam leakage, either out of the flow path or into the flow path, from an area of higher pressure to an area of lower pressure, is generally undesirable.

To facilitate minimizing flow-path leakage, at least some known turbines use a plurality of labyrinth seals. Known labyrinth seals include longitudinally spaced-apart rows of labyrinth seal teeth to facilitate sealing against high-pressure differentials that may be present in a turbine. However, anticipated relative axial movements between rotary and stationary components may exclude the use of labyrinth seals when covers are peened across tenons extending from the bucket tips. In addition, centrifugal stresses induced in the covers and tenons may limit the size and amount of sealable contact to a single seal member positioned along the exit side of the blade. However, such seal configurations may have a relatively high flow coefficient in comparison to other labyrinth seal arrangements. Furthermore, single seal members may also be more sensitive to relative axial movements between rotary and stationary components. Alternatives to single exit side seals are tip brush seals and integral cover buckets, however, both of these alternatives are generally more costly and may be far less reliable than the single seal member arrangement.

BRIEF DESCRIPTION OF THE INVENTION

In one aspect, a method to facilitate sealing between a rotary component and a stationary component is provided. The rotary component includes at least one bucket secured thereon, the bucket having a flow admission side and a flow exit side. The method includes coupling a spill strip in a gap defined between the rotary and stationary component, wherein the spill strip has a substantially flat contact surface, and coupling a cover to a radially outer tip of the bucket, wherein a protrusion extends from the bucket cover to nearly contact the substantially flat contact surface of the spill strip.

In another aspect, a turbine is provided. The turbine includes an outer housing, a rotor shaft rotatably supported in the outer housing about a first axis, and a bucket secured to the rotor shaft with a bucket cover on a distal tip of the bucket. The bucket having a flow admission side and a flow exit side. A nozzle diaphragm is attached to the outer housing. The nozzle diaphragm has a spill strip positioned opposite from the bucket cover and the spill strip has a substantially flat contact surface. The turbine further includes a protrusion extending from the bucket cover to provide a seal with the spill strip in a gap between the bucket cover and the substantially flat contact surface.

In a further aspect, a power system is provided. The power system includes a turbine having an outer housing, a rotor shaft rotatably supported in the outer housing about a first axis, and a bucket secured to the rotor shaft with a bucket cover on a distal tip of the bucket. The bucket having a flow admission side and a flow exit side. A nozzle diaphragm is attached to the outer housing. The nozzle diaphragm has a spill strip positioned opposite from the bucket cover and the spill strip has a substantially flat contact surface. The turbine further includes a protrusion extending from the bucket cover to provide a seal with the spill strip in a gap between the bucket cover and the substantially flat contact surface.

DETAILED DESCRIPTION OF THE INVENTION

Figure 1:
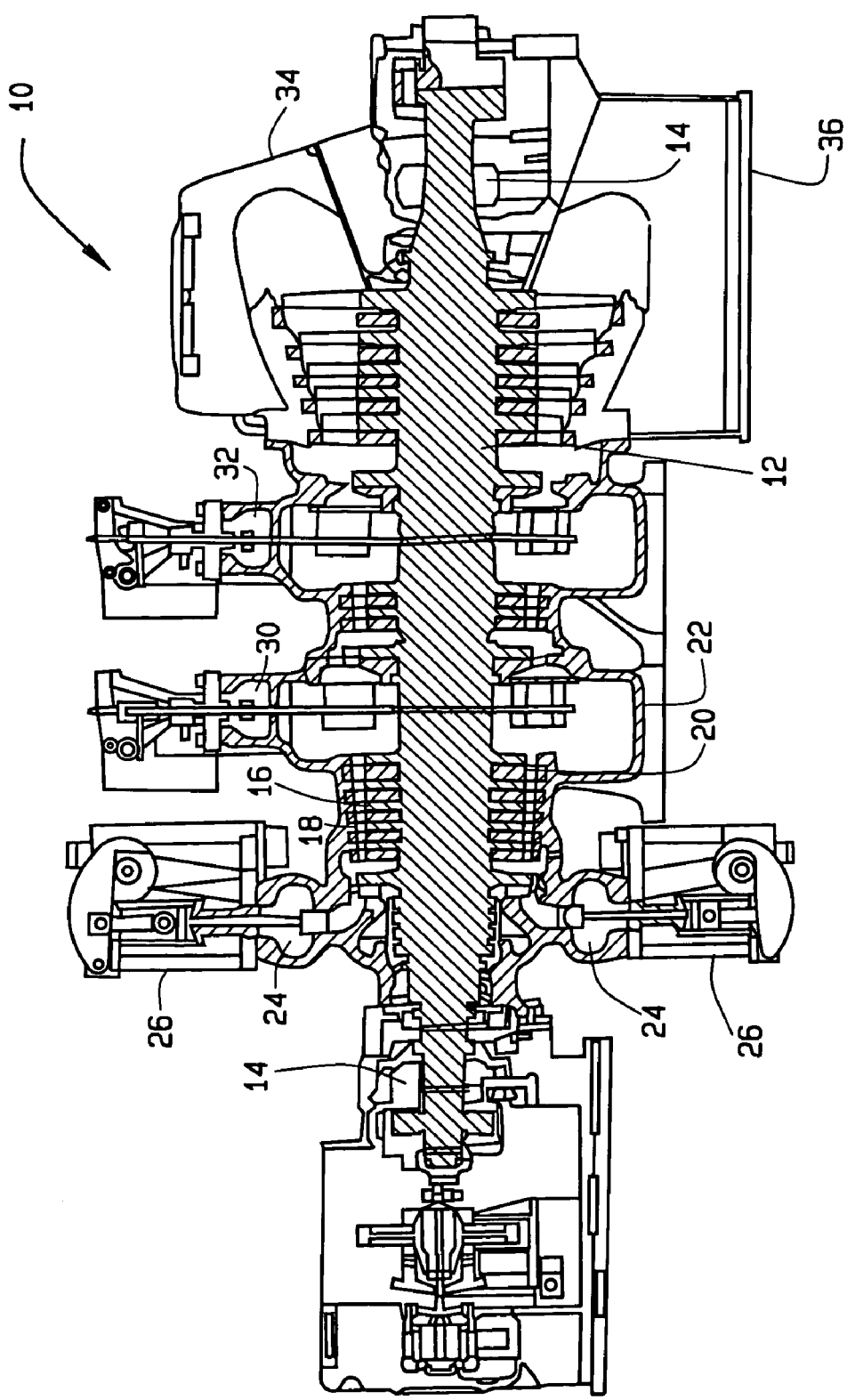
FIG. 1 is a cross-sectional view of an exemplary steam turbine.

FIG. 1 is a cross-sectional view of an exemplary steam turbine 10. Steam turbine 10 includes a shaft 12 extending through turbine 10 and rotatably supported at each end by bearing supports 14. A plurality of rows of turbine blades 16 are coupled to shaft 12, and a plurality of stationary turbine nozzles 18 are positioned between adjacent rows of turbine blades 16. Turbine blades 16 are coupled to turbine shaft 12, and turbine nozzles 18 are coupled to support members or nozzle diaphragms 20 attached to a housing or shell 22 surrounding turbine blades 16 and nozzles 18. Steam inlet ports 24 channel steam supplied from a steam source into turbine 10, and main steam control valves 26 control the flow of steam into turbine 10.

In operation, steam is directed through nozzles 18 to impact blades 16, which causes blades 16 to rotate with turbine shaft 12. A portion of steam discharged through nozzles 18 enters extraction chambers 30 and 32, and a predetermined amount of steam is also routed to various feedwater heaters (not shown). After the steam passes through turbine blades 16, the steam is discharged through steam exhaust casing 34 and exhaust outlet 36 and returned to a condenser (not shown) for recovery.

Figure 2:
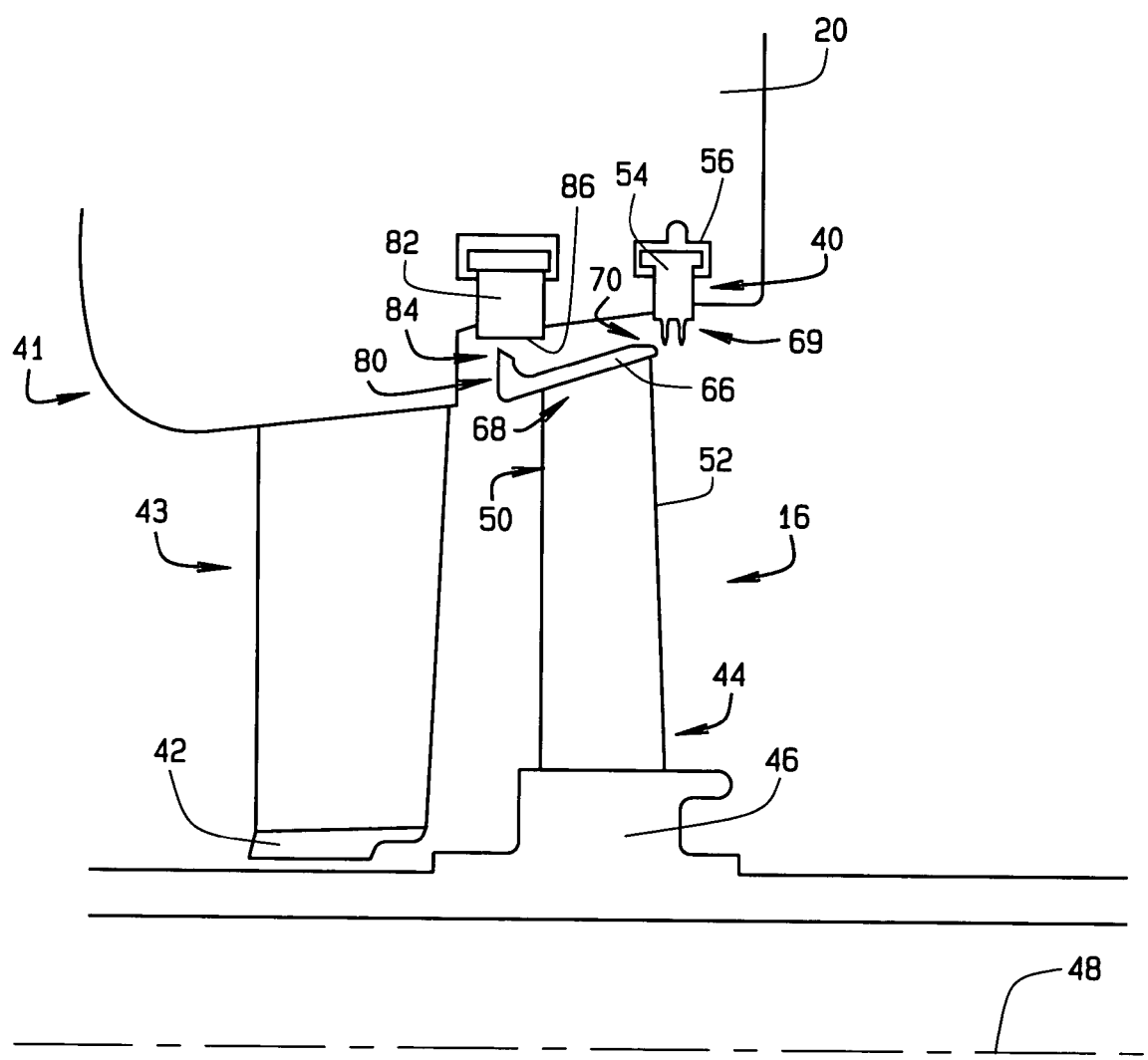
FIG. 2 is an enlarged cross-sectional view of a nozzle diaphragm and a bucket shown in FIG. 1.

FIG. 2 is a cross-sectional view of nozzle diaphragm 20 and bucket 16. Nozzle diaphragm 20 includes an outer ring portion 41 coupled to outer turbine housing 22 (shown in FIG. 1), an inner ring portion 42, and a nozzle airfoil portion 43. Turbine buckets 16 are secured at their radially inner ends 44 to turbine wheels 46 extending from turbine shaft 12 and rotatable about an axis 48. Bucket 16 has a flow admission side 50 and a flow exit side 52.

A labyrinth seal 40 is disposed between nozzle diaphragm 20 and bucket 16. Labyrinth seal 40 includes a packing ring 54 mounted in a circumferentially extending groove 56 in nozzle diaphragm 20. Packing ring 54 includes a sealing means, such as a plurality of axially spaced labyrinth seal teeth 64 extending from packing ring 54. Packing sealing means can also include a brush seal (not shown) or a combination of axially spaced labyrinth seal teeth 69 and a brush seal.

Bucket 16 has a bucket cover 66 at its distal end or tip 68. Bucket cover 66 is fastened to bucket 16 by a peened tenon (not shown). Bucket covers are typically segmented in groupings of four, five or six buckets per bucket cover. Bucket cover 66 has a packing surface 70 positioned adjacent to flow exit side 52. Packing surface is substantially flat with respect to first axis 48. In one embodiment, packing ring 54 is positioned opposite packing surface 70 to provide a seal in a gap between packing surface 70 and plurality of teeth 64.

Labyrinth seal 40 functions by placing a relatively large number of barriers, i.e., the teeth, to the flow of fluid from a high pressure region to a low pressure region on opposite sides of the seal, with each barrier forcing the fluid to follow a tortuous path whereby leakage flow is reduced. The sum of the pressure drops across labyrinth seal 40 is by definition the pressure difference between the high and low pressure regions on axially opposite sides thereof. Packing ring 54 is typically spring-backed and are thus free to move radially when subjected to severe rotor/seal interference.

A projection 80 extends from bucket cover 66 towards a spill strip 82 in nozzle diaphragm 20 which is positioned opposite from projection 80. In the exemplary, projection 80 is positioned adjacent to flow admission side 50 of bucket 16. Projection 80 is substantially vertical with respect to first axis 48. In one embodiment, projection 80 is in the shape of a horn having a pointed end 84. In another embodiment, projection 80 is integral to bucket cover 66. The added stiffness of projection 80 on flow admission side 50 eliminates the need for corner cuts on the ends of groupings of covers.

Spill strip 82 has a substantially flat contact surface 86 with respect to first axis 48. In one embodiment, contact surface 86 is toothless. Projection nearly contacts contact surface 86 of spill strip 82. Projection 80 seals against contact surface 86 providing a seal in the gap between projection 80 and spill strip 82. In one embodiment, spill strip 82 is made from a deformable material, such as leaded bronze. In another embodiment, spill strip 82 is made from any suitable material based on temperature requirements for a various operating conditions. In another embodiment, spill strip 82 is spring-backed and thus free to move radially and maintain spill strip 82 radially outwardly away from projection 80.

The above described projection provides a lower flow coefficient than a single exit seal configuration. The projection is less sensitive to relative axial movements between rotary and stationary components. As a result, the projection significantly improves the performance of the turbine in a cost effective and time saving manner.

Although the invention is herein described and illustrated in association with a turbine for a steam turbine engine, it should be understood that the present invention may be used for controlling leakage of any fluid between any generally high pressure area and any generally low pressure area within a steam turbine engine. Accordingly, practice of the present invention is not limited to steam turbine engines.

While the invention has been described in terms of various specific embodiments, those skilled in the art will recognize that the invention can be practiced with modification within the spirit and scope of the claims.

What is claimed is:

1. A method to facilitate sealing between a rotary component and a stationary component, wherein the rotary component includes at least one bucket secured thereon, the bucket having a flow admission side and a flow exit side, said method comprising:
   coupling a spill strip in a gap defined between the rotary and stationary component, wherein the spill strip has a substantially flat contact surface, and wherein the spill strip is spring backed and movable in the radial direction; and
   coupling a cover to a radially outer tip of the bucket, wherein a protrusion extends from the bucket cover to nearly contact the substantially flat contact surface of the spill strip.

2. A method according to claim 1 wherein coupling a cover to a radially outer tip of the bucket further comprises coupling a cover including the protrusion that is substantially perpendicular with respect to a first axis.

3. A method according to claim 2 wherein said coupling a cover to a radially outer tip of the bucket further comprises providing that the protrusion is horn shaped.

4. A method according to claim 1 wherein said coupling a cover to a radially outer tip of the bucket further comprises providing that the protrusion is integral to the bucket cover.

5. A method according to claim 1 wherein said coupling a cover to a radially outer tip further comprises providing that the protrusion is positioned on the flow admission side of the bucket.

6. A method according to claim 1 wherein said coupling a cover to a radially outer tip further comprises providing that the spill strip is deformable.

7. A method according to claim 6 wherein said coupling a cover to a radially outer tip further comprises providing that the spill strip comprises leaded bronze.

8. A method according to claim 1 further comprising providing a labyrinth seal disposed between the bucket and the stationary component, the labyrinth seal further comprising:
   a substantially flat packing surface on the bucket cover, the packing surface positioned adjacent to the flow exit side; and
   a plurality of teeth extending from the toward the packing surface to provide a seal in the gap between the bucket and the nozzle diaphragm.

9. A turbine comprising:
   an outer housing;
   a rotor shaft rotatably supported in said outer housing about a first axis;
   a bucket secured to said rotor shaft, said bucket having a bucket cover on a distal tip of said bucket, said bucket having a flow admission side and a flow exit side;
   a nozzle diaphragm attached to said outer housing, said nozzle diaphragm having a spill strip positioned opposite from said bucket cover, said spill strip having a substantially flat contact surface; and wherein the spill strip is spring backed and movable in the radial direction; and
   a protrusion extending from said bucket cover to provide a seal with said spill strip in a gap between said bucket cover and said substantially flat contact surface.

10. The turbine according to claim 9 wherein said protrusion is substantially vertical with respect to said first axis.

11. The turbine according to claim 10 wherein said protrusion is horn shaped.

12. The turbine according to claim 9 wherein said protrusion is integral to said bucket cover.

13. The turbine according to claim 9 wherein said protrusion is positioned on said flow admission side of said bucket.

14. The turbine according to claim 9 wherein said spill strip is deformable.

15. The turbine according to claim 14 wherein said spill strip comprises leaded bronze.

16. The turbine according to claim 9 further comprising a labyrinth seal disposed between said bucket and said nozzle diaphragm, said labyrinth seal further comprising:
- a substantially flat packing surface on said bucket cover, said packing surface positioned adjacent to said flow exit side; and
- a plurality of teeth extending from said nozzle diaphragm toward said packing surface to provide a seal in the gap between the bucket and the nozzle diaphragm.

17. A power system comprising:
- a turbine having an outer housing;
- a rotor shaft rotatably supported in said outer housing about a first axis;
- a bucket secured to said rotor shaft, said bucket having a bucket cover on a distal tip of said bucket, said bucket having a flow admission side and a flow exit side;
- a nozzle diaphragm attached to said outer housing, said nozzle diaphragm having a spill strip positioned opposite from said bucket cover, said spill strip having a substantially flat contact surface; and wherein the spill strip is spring backed and movable in the radial direction; and
- a protrusion extending from said bucket cover to provide a seal with said spill strip in a gap between said bucket cover and said substantially flat contact surface.

18. The power system according to claim 17 wherein said protrusion is substantially vertical with respect to said first axis.

19. The power system according to claim 18 wherein said protrusion is horn shaped.

20. The power system according to claim 17 wherein said protrusion is integral to said bucket cover.

21. The power system according to claim 17 wherein said protrusion is positioned on said flow admission side of said bucket.

22. The power system according to claim 17 wherein said spill strip is deformable.

23. The power system according to claim 22 wherein said spill strip comprises leaded bronze.

24. The power system according to claim 17 further comprising a labyrinth seal disposed between said bucket and said nozzle diaphragm, said labyrinth seal further comprising:
- a substantially flat packing surface on said bucket cover, said packing surface positioned adjacent to said flow exit side; and
- a plurality of teeth extending from said nozzle diaphragm toward said packing surface to provide a seal in the gap between the bucket and the nozzle diaphragm.

* * * * *

UNITED STATES PATENT AND TRADEMARK OFFICE
CERTIFICATE OF CORRECTION

PATENT NO. : 7,059,821 B2  Page 1 of 1
APPLICATION NO. : 10/431157
DATED : June 13, 2006
INVENTOR(S) : Farrell et al.

It is certified that error appears in the above-identified patent and that said Letters Patent is hereby corrected as shown below:

In Claim 8, column 4, line 43, between "the" and "toward" insert -- stationary component --.
In Claim 9, column 4, line 56, delete "surface; and" and insert therefor -- surface, and --.
In Claim 17, column 5, line 27, delete "surface; and" and insert therefor -- surface, and --.

Signed and Sealed this

Fourth Day of December, 2007

JON W. DUDAS
*Director of the United States Patent and Trademark Office*